United States Patent [19]

Shirai et al.

[11] Patent Number: 5,143,487
[45] Date of Patent: Sep. 1, 1992

[54] THROW AWAY TIP

[75] Inventors: Makoto Shirai; Katsuhiko Sumida, both of Nagoya, Japan

[73] Assignee: NGK Spark Plug Co., Ltd., Aichi, Japan

[21] Appl. No.: 518,632

[22] Filed: May 2, 1990

[30] Foreign Application Priority Data

May 12, 1989 [JP] Japan .................................. 1-54838

[51] Int. Cl.⁵ ............................................. B23P 15/28
[52] U.S. Cl. ..................................... 407/117; 407/113; 407/115
[58] Field of Search ............... 407/117, 113, 114, 115, 407/116

[56] References Cited

U.S. PATENT DOCUMENTS 4,475,851 10/1984 Hale ..................................... 407/114

FOREIGN PATENT DOCUMENTS 0633669 7/1936 Fed. Rep. of Germany ...... 407/117
62-172505 11/1987 Japan .
0986616 1/1983 U.S.S.R. ............................. 407/117
1440615 11/1988 U.S.S.R. ............................. 407/117

Primary Examiner—Bruce M. Kisliuk
Assistant Examiner—Lawrence Cruz
Attorney, Agent, or Firm—Sughrue, Mion, Zinn, Macpeak & Seas

[57] ABSTRACT

A throw away tip used for back-turning in which the throw away tip cuts deeply into work material in one direction in depth setting and machines in a different direction from the that of the depth setting has at least an end cutting flank for cutting into work material as depth setting. One or more than one middle cutting flanks are connected with the end cutting flank on the feed-direction side of the side cutting flank. The rake surface is provided with first and second chip breakers grooved along the end cutting flank and the middle cutting flank, respectively. A rake face is connected with the above flanks. The end cutting flank has an acute end cutting edge angle. The middle cutting flank has a cutting edge angle wider than the end cutting edge angle and narrower than a right angle. The side cutting flank has a setting angle which is wider than the entering angle.

8 Claims, 4 Drawing Sheets

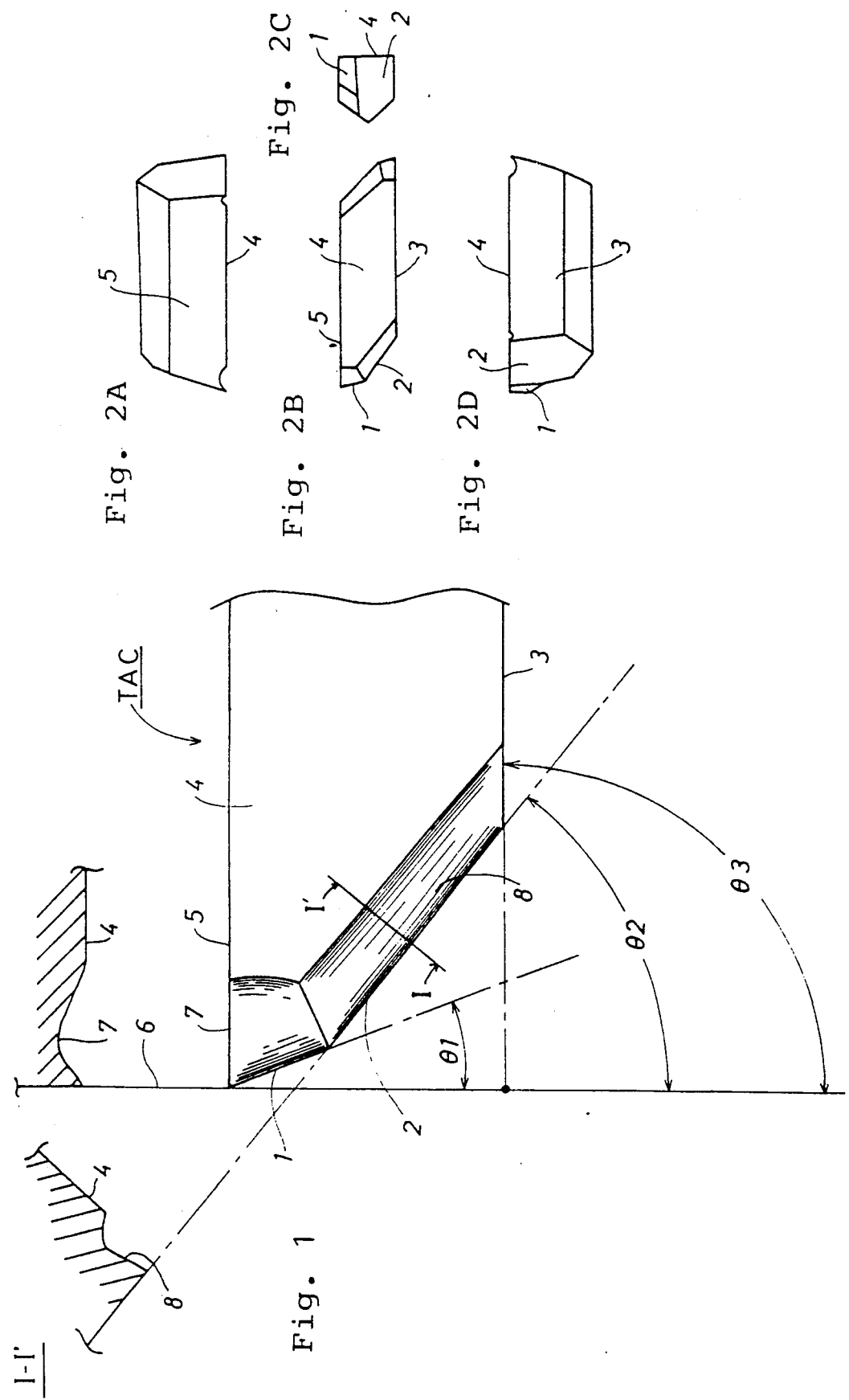

THROW AWAY TIP

BACKGROUND OF THE INVENTION

1. Field of the invention

The present invention relates to a throw away tip, and more particularly to a throw away tip suitable for back-turning, wherein a throw away tip cuts deeply into a work material in depth setting and machines in a different direction from that of the depth setting mainly at a right angle to the direction of the depth setting.

2. Related art

In back-turning, a cutting tool fixed to a machine is subject to a heavy load due to its large contact area with the work material during depth setting and subsequent machining. Especially when a cutting tool cuts deeply in depth setting, the cutting tool's contact area with the work material becomes quite large during machining. Conventionally, brazed tools or solid tools have been used, if a work material is to be cut into deeply prior to machining, to avoid shifting tips on the fixture and other problems.

In brazed tools or solid tools, however, the changing of tips is either difficult or impossible. Further, these types of cutting tools can be provided with only one tip. These problems cause a heavier workload and higher costs.

Despite the above-identified problems that brazed tools and other types of cutting tools have, conventional throw away tips have rarely been used for back-turning because conventional throw away tips may shift on the fixture when receiving a heavy load. Furthermore, there is no proposed throw away tip suitable for the back-turning operation where the tip cuts deeply into work material in depth setting and consequently receives a heavy load.

The present applicant disclosed a throw away tip in Japan Published Unexamined Utility Model Application No. S62-172505. Its plane view is shown in FIG. 4. This related-art throw away tip is constructed approximately in the shape of a triangle as seen from above. The related-art throw away tip is not suitable for cutting deeply (8 mm for instance) into work material in the depth setting and in machining the work material due to the following problems arising from its approximately triangular shape.

The related-art throw away tip must have a longer side which forms a major cutting edge 30 in order to perform back-turning in which the tip cuts deeply into the work material and then machines the work material. However, if the side forming the major cutting edge 30 is made longer, other sides must also be made longer, thus making the whole tip extremely large. Consequently, the resistance produced during the depth setting, along with other resistances, will increase, hindering the back-turning operation. Moreover, such a large tip will not be able to perform fine back-turning.

On the other hand, if the length of the major cutting edge 30 is made shorter(for instance 1-2 mm), cutting efficiency will be reduced because repeated operations of the depth setting and machining will be required to achieve sufficient depth of cut.

Some machines cut to a predetermined depth in one depth setting operation prior to machining. This type of machine will not be able to use the throw away tip shown in FIG. 4 if the major cutting edge is designed shorter.

SUMMARY OF THE INVENTION

An object of the present invention is to provide a throw away tip which can solve the above-identified problems and smoothly perform back-turning in which a deep cut is made.

The throw away tip for back-turning work material by cutting into the work material during depth setting in a first direction and during machining in a second direction different from the first direction, comprising: a piece of material having an end cutting flank for cutting into the work material in the first direction, the end cutting flank being formed on the piece of material at an end cutting angle, where the end cutting angle is defined as the angle between the end cutting flank and a plane, at least one middle cutting flank connected with the end cutting flank, the at least one middle cutting flank being formed on the piece of material at an entering angle, where the entering angle is defined as the angle between the at least one middle cutting flank and the plane, and a side cutting flank connected with the at least one middle cutting flank for machining the work material in the second direction, the side cutting flank being formed on the piece of material at a setting angle, where the setting angle is defined as the angle between the side cutting flank and the plane; wherein the plane contains a line defined by the second direction and is orthogonal to a line defined by the first direction; and the end cutting angle and the entering angle are acute angles, the entering angle is greater than the end cutting angle, and the setting angle is greater than the entering angle.

The throw away tip of the present invention also includes a rake face provided on the piece such that the rake face is connected to the end cutting flank, the at least one middle cutting flank, and the side cutting flank; wherein a first chip breaker grooved along the rake face adjacent to the end cutting flank but not reaching the middle cutting flank and a second chip breaker grooved along the rake face adjacent to the middle cutting flank but not reaching the side cutting flank.

In the throw away tip of the present invention, the end cutting flank mainly performs depth setting and surface finishing in machining following the depth setting (this subsequent machining operation referred to as feed machining hereinafter). The machining is performed in a direction different from that of the depth setting. The end cutting flank can smooth out the surface of work material because the end cutting edge angle is narrower than the entering angle. Moreover, the end cutting flank carries out depth setting without difficulty because the end cutting edge angle of the end cutting flank is an acute angle. The side cutting flank is mainly responsible for cutting the work material during the feed machining. Because of the side cutting flank, a deep cutting into work material and subsequent feed machining can be achieved. The side cutting flank causes strong cutting resistance due to its wide cutting edge angle (the setting angle). However, the middle cutting flank having the entering angle contributes to the reduction of cutting resistance because the entering angle of the middle cutting flank located between the end cutting flank and the side cutting flank is narrower than the setting angle.

The first chip breaker grooved on the rake face effectively disposes of chips in depth setting. Since the first chip breaker does not reach the middle cutting flank, the middle cutting flank does not have a groove-shaped curve on its edge made by the first chip breaker. High cutting ability of middle cutting flank, therefore, is guaranteed. The second chip breaker grooved on the rake face effectively disposes of chips in depth setting. Since the second chip breaker does not reach the end cutting flank, the end cutting flank does not have a groove-shaped curve on its edge made by the second chip breaker. Thus high cutting ability of the end cutting flank is maintained. Due to all the functions of the throw away tip of the present invention realized by the configuration thereof and the chip breaker grooved thereon, the throw away tip can cut deeply into work material in depth setting in which a heavy load is applied to the throw away tip.

BRIEF DESCRIPTION OF THE ATTACHED DRAWINGS

FIG. 1 is a partial schematic view illustrating the flanks of a throw away tip of an embodiment of the present invention.

FIG. 2A is a plane view of the embodiment.

FIG. 2B is a elevational view of the embodiment.

FIG. 2C is a view illustrating the rake face of the embodiment.

FIG. 2D is a bottom view of the embodiment.

DETAILED DESCRIPTION OF THE PREFERRED EMBODIMENT

Figure 3:
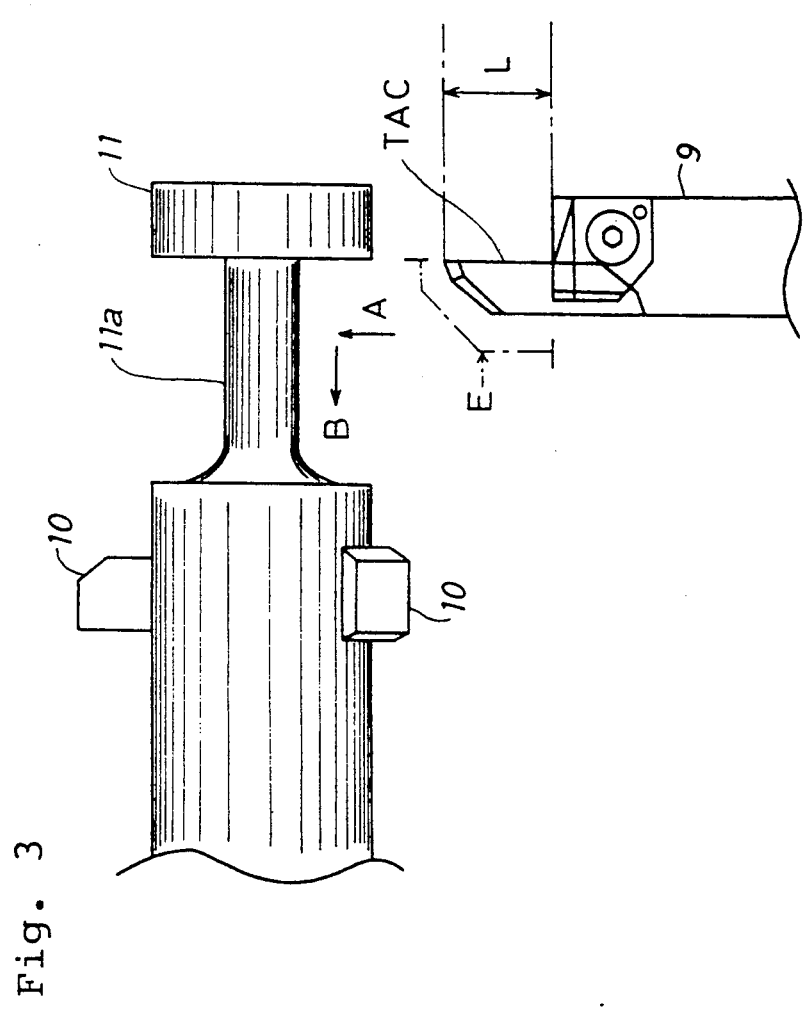
FIG. 3 is a schematic illustration of an operation of the throw away tip of the embodiment.
Figure 4:
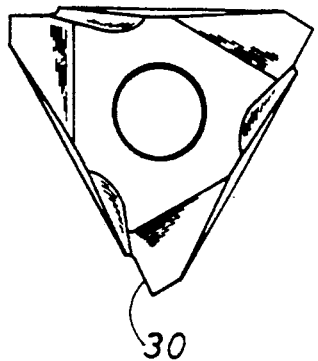
FIG. 4 is a plane view of a conventional throw away tip which can perform back-turning.
Figure 6:
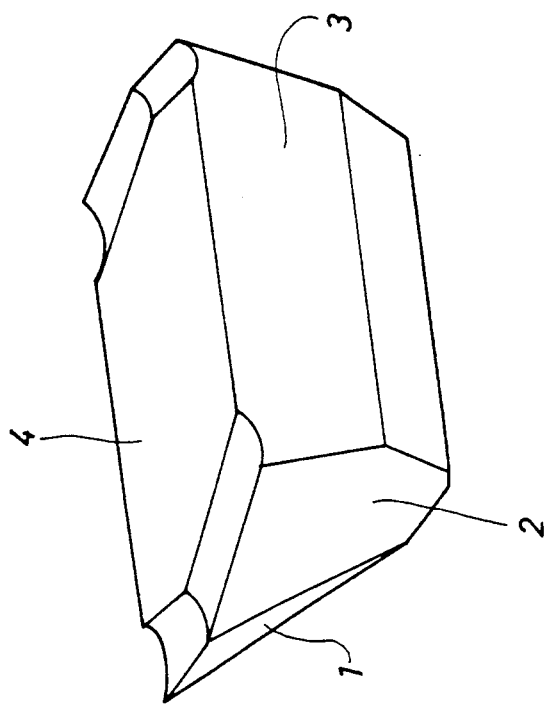
FIG. 6 is a perspective view of the throw away tip of the embodiment seen from another angle.
Figure 5:
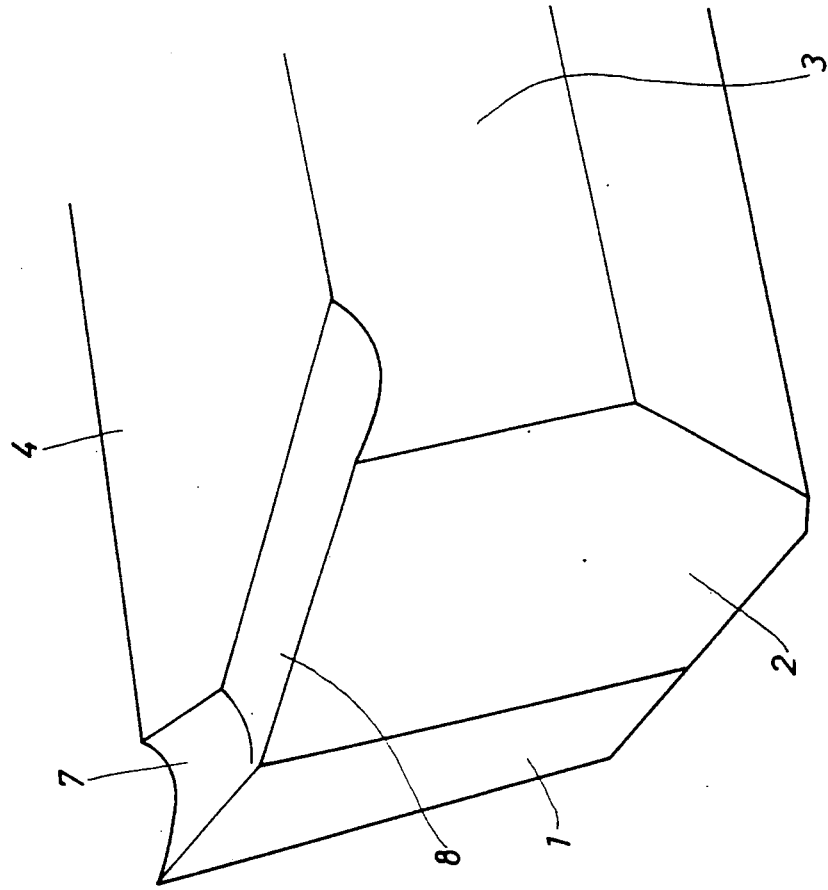
FIG. 5 is an enlarged perspective view of the throw away tip of the embodiment.

As illustrated in the attached figures, the throw away tip TAC of a preferred embodiment is basically a columnar solid. The throw away tip TAC is provided with cutting edges for back-turning on both of the longitudinal ends thereof. First, the throw away tip of the present embodiment is held firmly against work material to perform depth setting. Second, the throw away tip TAC machines in a direction at a right angle to that of the depth setting.

The cutting end of the throw away tip TAC, which characterizes the present embodiment, comprises an end cutting flank 1 for cutting into work material in depth setting, a middle cutting flank 2 connected with the end cutting flank 1 on the feed-direction side of the end cutting flank 1, the side cutting flank 3 connected with the middle cutting flank 2 on the feed-direction side of the middle cutting flank 2, and a rake face connected with each of the above flanks. In addition to the above flanks and faces, which are essential for cutting deeply into work material prior to machining, each cutting end is provided with a side flank 5. The side flank 5 is connected with the end cutting flank 1 on the side opposite to the feed direction and runs approximately parallel to the side cutting flank 3.

The end cutting flank 1 has an end cutting edge angle $\theta 1$ of 15° made by the end cutting flank 1 with a plane 6 (orthogonal to the page in FIG. 1) extending along the feed direction. The end cutting edge angle $\theta 1$ is on the feed-direction side of the throw away tip TAC. The middle cutting flank 2 has an entering angle $\theta 2$ of 45°, which is wider than the end cutting edge angle $\theta 1$. A setting angle $\theta 3$ of the side cutting flank 3 is at a right angle to the plane 6 and wider than the end cutting edge angle $\theta 1$ and the entering angle $\theta 2$.

The rake surface 4 is provided with first and second chip breakers 7 and 8 grooved thereon. The first chip breaker 7 runs from the side flank 5 along the end cutting flank 1 and does not reach the middle cutting flank 2. The second chip breaker 8 runs along the middle cutting flank 2 and terminates before reaching the end cutting flank 1.

An operation of the throw away tip TAC of the present embodiment is schematically illustrated in FIG. 3. The throw away tip TAC of the present embodiment attached to a fixture 9 performs back-turning in which rotating work material 11 is cut into deeply in the direction indicated at arrow A by carrying out depth setting once, and the work material 11 is feed-machined in the direction indicated at arrow B as shown in FIG. 3. During the operation, the work material 11 is held by a chuck 10. The maximum cutting depth of the throw away tip TAC is indicated at character L while the effective cutting edge is indicated at character E.

The end cutting flank 1 is mainly responsible for depth setting and finishing the surface following the depth setting. The throw away tip TAC, due to the end cutting flank 1, can achieve a smoother machined surface 11a of the work material 11 than a throw away tip not provided with the end cutting flank 1 in which the middle cutting flank 2 would be directly connected with the side flank 5. This is because the narrower the end cutting edge angle $\theta 1$ is, the smoother the machined surface 11a is. However, if the end cutting edge angle $\theta 1$ is made too narrow, the resistance produced during depth setting becomes very strong. Therefore, the end cutting edge angle $\theta 1$ needs to be determined in view of the two conflicting factors. Preferably, the end cutting edge angle $\theta 1$ ranges from 5° to 30°. On the other hand, the main function of the middle cutting flank 2 and the side cutting flank 3 is to carry out feed machining.

Due to the side cutting flank 3, deep cutting into work material and subsequent feed machining can be achieved. The side cutting flank 3 causes strong cutting resistance because the side cutting flank 3 machines the work material 11 at an approximately right angle. However, the middle cutting flank 2 having the entering angle $\theta 2$ (90° or less) which is narrower than a setting angle $\theta 3$ of the side cutting flank 3 contributes to the reduction of feed-machining resistance. Smooth machining, therefore, can be done. To carry out machining smoothly, the end cutting edge angle $\theta 1$ and the entering angle $\theta 2$ are preferably from 30° to 80° and 90°, respectively.

The first chip breaker 7 grooved on the rake face 4 along the end cutting flank 1 effectively disposes of chips while the work material 11 is cut into. Since the first chip breaker 7 does not reach the middle cutting flank 2, the middle cutting flank 2 does not have a groove-shaped curve on its edge made by the first chip breaker 7. The high feed-machining ability is thus maintained.

On the other hand, the second chip breaker 8 grooved along the middle cutting flank 2 effectively disposes of chips when feed-machining work material 11. Since the second chip breaker 8 does not reach the end cutting flank 1, the end cutting flank 1 does not also have a groove-shaped curve on its edge made by the second chip breaker 8. Thus the high depth-setting ability of the middle cutting flank 2 is maintained.

The throw away tip of the present embodiment can be manufactured in various methods. For instance, the chip breakers as well as other external features may be made by molding.

The following are the conditions and results of test back-turning.

Conditions

Bars having an outside diameter ranging from 10 to 32 mm were back-turned at depth of cut from 3 to 10 mm and feed from 0.02 to 0.05 mm per revolution Work material: Japan Industrial Standard SUS304 Cutting speed: 50 to 150 m per minute Material of the throw away tip: cermet Maximum depth of cut: 10 mm Results The throw away tip TAC of the present embodiment did not shift on the fixture during the back-turning. The roughness of the machined surface of the work material was as satisfactory as the surface machined by a brazed tool or a solid tool.

As described above, the flanks, the chip breakers, and other features of the present embodiment cooperate to reduce depth-setting resistance and feed-machining resistance while achieving machined surface smooth enough for practical use and effective disposal of chips.

Consequently, the throw away tip can perform the back-turning in which work material is cut into deeply. Moreover, since the deep cutting and feed machining can be done in one operation, the throw away tip can be used on machines which cut to a predetermined depth in one depth setting operation.

While the described embodiment represents the preferred form of the present invention, it is to be understood that changes and variations may be made without departing from the spirit and the scope of the invention.

For instance, the first chip breaker 7 may be provided with a land in the above embodiment in order to strengthen the edge. Another chip breaker could be provided in the rake face along the side cutting flank. A plurality of middle cutting flanks could be constructed.

As is clearly shown in the above description, depth-setting resistance and feed-machining resistance can be reduced in accordance with the present invention. In addition, the throw away tip of the present invention realizes a machined surface smooth enough for practical use as well as effective disposal of chips.

Consequently, the throw away tip of the present invention can perform the back-turning in which work material is cut into deeply whereas this type of back-turning operation has conventionally required a solid tool or the like. The throw away tip of the present invention can economically carry out such back-turning without increasing a workload. Moreover, since the deep cutting and feed machining can be done in one operation, the throw away tip achieves high efficiency and also can be used on machines which cut to a predetermined depth in one depth-setting operation.

What is claimed is:

1. A throw away tip for back-turning work material by cutting into the work material during depth setting in a first direction and during machining in a second direction different from the first direction, comprising:
   an end cutting flank for cutting said work material in said first direction, said end cutting flank forming an end cutting angle between said end cutting flank and a first plane,
   at least one middle cutting flank abutting said end cutting flank and forming an entering angle between said at least one middle cutting flank and said first plane, and
   a side cutting flank abutting said at least one middle cutting flank for machining said work material in said second direction, said side cutting flank forming a setting angle between said cutting flank and said first plane; wherein
   said first plane contains a line defined by said second direction and is orthogonal to a line defined by said first direction; and said end cutting angle and said entering angle are acute angles, said entering angle is greater than said end cutting angle, and said setting angle is greater than said entering angle.

2. The throw away tip of claim 1, in which:
   a rake face is provided on the piece such that the rake face is connected to the end cutting flank, and at least one middle cutting flank, and the side cutting flank; wherein
   a first chip breaker is grooved along the rake face adjacent to the end cutting flank but not reaching the at least one middle cutting flank and a second chip breaker is grooved along the rake face adjacent to the at least one middle cutting flank but not reaching the side cutting flank.

3. The throw away tip of claim 1, in which the first direction is at a right angle to the second direction.

4. The throw away tip of claim 3, in which the setting angle is 90°.

5. The throw away tip of claim 4, in which a plurality of middle cutting flanks are formed on the piece.

6. The throw away tip of claim 4, in which the angle is from 5° to 30° and the entering angle is from 30° to 80°.

7. The throw away tip of claim 6, in which the end cutting angle is a 15° angle and the entering angle is a 45° angle.

8. The throw away tip of claim 2, in which the piece of material is formed from cermet.

* * * * *